United States Patent
Kolb

[11] 3,768,113
[45] Oct. 30, 1973

[54] WINDSHIELD WIPER ASSEMBLY
[75] Inventor: Erich Kolb, Eisental, Germany
[73] Assignee: Robert Bosch GmbH, Stuttgart, Germany
[22] Filed: Oct. 26, 1971
[21] Appl. No.: 192,369

[30] Foreign Application Priority Data
Oct. 26, 1970 Germany.................. P 70 39 639.3

[52] U.S. Cl. .............................................. 15/250.32
[51] Int. Cl. .............................................. B60s 1/40
[58] Field of Search .................... 15/250.31, 250.32, 15/250.34, 250.42

[56] References Cited
UNITED STATES PATENTS
3,550,180   12/1970   Arman.............................. 15/250.32

FOREIGN PATENTS OR APPLICATIONS
1,190,348   4/1965   Germany ......................... 15/250.32

*Primary Examiner*—Peter Feldman
*Attorney*—Michael S. Striker

[57]   ABSTRACT

A wiper blade is provided with a carrier and a mounting element for the carrier which has an elongated channel provided with an open end. An end portion of a wiper arm is releasably insertable into the channel through the open end and a latching spring of strip-shaped configuration is loosely slidably accommodated in the channel and provided with three longitudinally spaced stand-out detent portions two of which engage the end portion of the wiper arm at spaced locations and one of which releasably engages a portion of the mounting element.

9 Claims, 4 Drawing Figures 3,768,113

INVENTOR
ERICH KOLB
BY Michael S. Striker
ATTORNEY

WINDSHIELD WIPER ASSEMBLY

BACKGROUND OF THE INVENTION

The present invention relates generally to a windshield wiper assembly, and more particularly to an improved windshield wiper assembly for automotive and other vehicles.

Windshield wiper assemblies are known in many constructions already. Generally speaking they all have a wiper arm which carries a mounting element or bracket on which the wiper blade is secured. The mounting bracket is usually releasably connected with the wiper arm, and for this purpose is frequently provided with an open-ended channel into which a free end portion of the wiper arm is insertable. An elongated strip-shaped latching spring is accommodated in the channel and provided at one end with a right-angled end portion which engages an abutment shoulder on the wiper arm end portion. The spring is of spring steel and cannot be very readily manufactured with the bent-over end portion because the latter must be very short due to the very limited available space in the channel, and because the bending-over of such short portion is difficult to carry out because it cannot be properly grasped for bending purposes and because after bending it has a tendency to return partially towards its original planar position.

Of course, such windshield wiper assemblies are manufactured in extremely large series, meaning that each individual component of such an assembly is similarly manufactured in such large series. Therefore any simplification in the manufacture of an individual component will result in significant overall savings which can of course in turn be translated into lower selling costs for the component and, ultimately, for the complete assembly.

SUMMARY OF THE INVENTION

Accordingly it is an object of the present invention, generally speaking, to provide the improvements just outlined.

More particularly it is an object of the present invention to provide a simplified windshield wiper assembly.

Still more particularly it is an object of the present invention to provide a windshield wiper assembly in which the latching spring utilized is of such construction that it can be readily and less expensively manufactured than heretofore possible.

In pursuance of the above objects, and of others which will become apparent hereafter, one feature of the invention resides in a windshield wiper assembly which, briefly stated, comprises a wiper blade, a carrier for the wiper blade and a mounting element for the carrier provided with an elongated channel having an open end. A wiper arm has an end portion adapted for releasable insertion into the channel through the open end. An elongated latching spring is slidably accommodated in the channel and comprises at least three detent portions two of which can reach the end portion at longitudinally spaced locations and one of which releasably engages the mounting element in the region of the open end thereof.

The latching spring is in conventional manner constituted by a strip-shaped length of spring steel from which the detent portions are struck out as latching or detent tongues. With this construction only relatively small bending angles of the latching or detent tongues with respect to the general plane of the spring are necessary, much smaller than 90°, as was previously the case, and they can be effected without any difficulty during the manufacturing operation.

According to a further concept of the invention the end portion of the wiper arm may be provided with a recess at one side into which one of the detent portions of the latching spring engages, and at the opposite side with a projecting latching nose, and at the opposite end of the channel, which is also open, it is advantageous if a wall portion of the ones bounding the channel is bent into the open end so as to provide a detent for the inner end of the spring so that the latter cannot be pushed out this opposite open end.

The latching spring is retained against undesired withdrawal from the channel if, in accordance with a further concept of the invention, the latching spring is provided intermediate its inner end and the detent portions with an abutment rib which cooperates with a further rib provided on one of the inner walls bounding the channel and limits the extent to which the latching spring can be withdrawn through the first-mentioned open end of the channel. Advantageously the rib on the inner wall of the channel at least in part embraces the latching spring so as to retain the latter between this rib and one of the walls bounding the channel.

When the wiper arm is to be released so that it can be withdrawn from the channel it is a simple manner to engage a free end portion or end section of the latching spring which projects outwardly from the first-mentioned open end of the channel and to displace it in such a manner that the detent portion cooperating with an abutment on the wall bounding the channel is disengaged therefrom, so that the end portion of the wiper arm can be withdrawn from the channel. Advantageously, this free end section is in form of a springy substantially hook-shaped configuration, and located beneath the wiper arm so as to be protected against contact with brushes of automatic car-wash installations so that no damage can result to such brushes from such contact, or to the spring from the brushes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
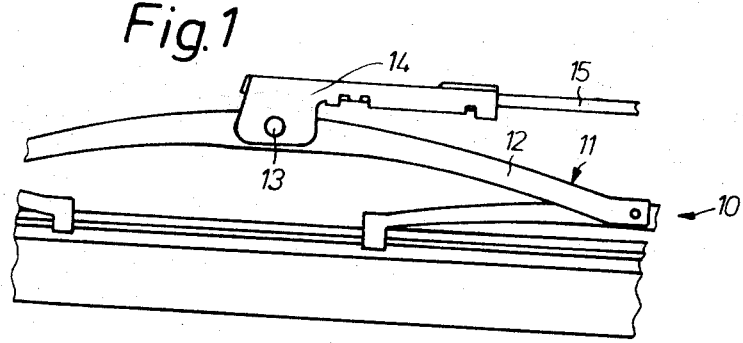
FIG. 1 is a fragmentary side-elevational view of a windshield wiper assembly according to the present invention.
Figure 3:
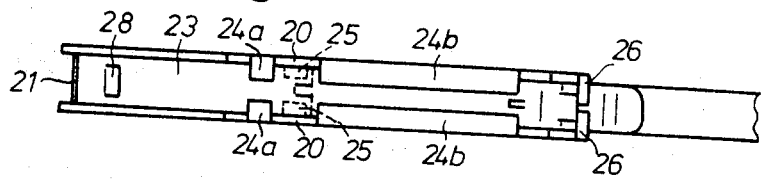
FIG. 3 is a bottom-plan view of FIG. 2.

Discussing now the drawing in detail it will be seen that in FIG. 1 I have illustrated a windshield wiper assembly 10 having a wiper blade 11 provided with a carrier or mount 12 which is articulately connected by means of a bolt 13 with a mounting element 14 by means of which the wiper blade 11 can be releasably connected with a wiper arm 15. This construction is known.

The mounting element 14 is provided with an elongated channel 16 having opposite open ends into one of which an end portion of the wiper arm 15 can be releasably inserted as illustrated. A nose or projection 17 is pressed out of the free end portion of the wiper arm 15 at one side and opposite this one side the wiper arm is provided with a corresponding recess or depression 18.

Figure 2:
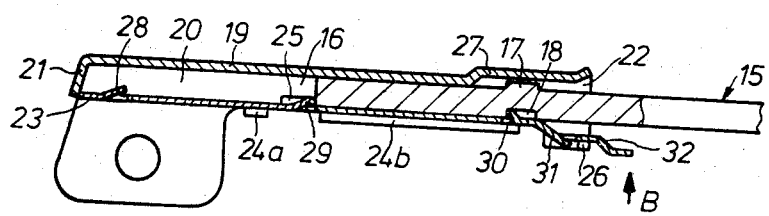
FIG. 2 is a fragmentary longitudinal sectional detail view, on an enlarged scale, showing details of a part of the embodiment in FIG. 1.
Figure 4:
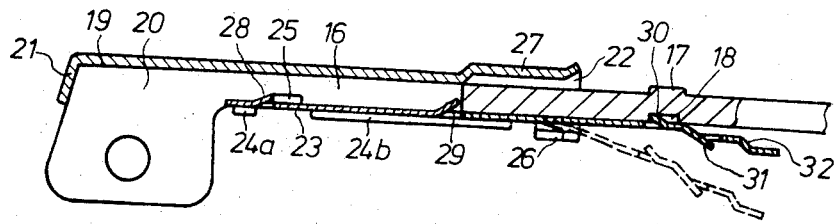
FIG. 4 illustrates the configuration of FIG. 2 with the components partly separated.

As reference to FIGS. 2 and 4 shows most clearly, the channel 16 is bounded at one side by a wall portion 19 and at sides normal thereto, that is at the lateral sides, by wall portions 20. The wall portion 19 extends beyond the location where the articulate connection with the element 14 is established, and is provided with an angled section 21 which extends across one open end of the channel, whereas the other open end 22 is the one through which the end portion of the wiper arm 15 is to be inserted.

Located freely longitudinally slidable in the channel 16 is a latching spring 23 of a length of spring steel strip. It serves to releasably retain the end portion of the arm 15 in the channel 16.

One major surface of the spring 23 abuts against inwardly angled projections 24a and 24b of the lateral wall portions 20 which thus extend across a side of the channel opposite the wall 19. Each of the wall portions 20 is further provided with an inwardly extending projection 25 the two of which retain the spring 23 slidably in abutment in the illustrated and described position.

The lateral wall portions 20 are provided in the region of the open end 22 with a further pair of projections 26 which are bent inwardly and spaced from the inserted end portion of the wiper arm 15 by a certain distance. In the region of the open end 22 the wall portion 19 is also provided with a recessed section 27 into which the nose or projection 17 of the wiper arm 15 is to enter when the latter is inserted.

In accordance with the present invention the spring 23 is provided with four projections or tongues 28, 29, 30 and 31 which serve as detent elements and are stamped or otherwise displaced out of the general plane of the spring 23. Of these projections, the one identified with reference numeral 28 contacts the abutments or portions 25 of the walls 20 when the spring 23 is withdrawn through the open end 22 to some extent. The leading end of the spring 23 abuts against the section 21 of the wall portion 19 when the spring is positioned in its intended operative position as shown in FIG. 2. In cooperation with one another, the leading end and the tongue 28 together with the section 21 and the projection 25 assure that the spring 23—once inserted into the channel—cannot become dislodged therefrom unintentionally or accidentally.

The projection 29 is inclined towards the open end 22 of channel 16 and engages the end face of the end portion of the wiper arm 15, whereas the projection 30 is inclined oppositely to the inclination of the projection 29 and extends into the recess 18 so that between the two projections 29 and 30 the spring 23 and the end portion of the wiper arm 15 are connected with one another.

An end section 32 of the spring 23, provided with the projection 31, is configured as a freely springy or deflectable handle which projects outwardly of the open end 22 of the channel 16 when the spring is in the operative position shown in FIG. 2 with the end portion of the wiper arm 15 being inserted into the channel 16. The section 32 is bent in the illustrated configuration (compare FIGS. 2 and 4) to an offset or approximately hook-shaped configuration in such a manner that the projection 31 will engage behind the inwardly bent projections 26 of the lateral wall portions 20.

When the wiper arm 15 is to be inserted into the channel 16, the spring 23 is first withdrawn from the channel 16 to such an extent that the projection 28 abuts against the projections 25 as shown in FIG. 4. Thereupon the free end portion of the wiper arm 15 is introduced into the space between the projections 29 and 30 so that projection 30 extends into the recess 18 whereas the projection 29 abuts against the free end face of the wiper arm end portion. The spring is now connected with the wiper arm in such a manner that they cannot be displaced longitudinally with reference to one another. Now the wiper arm 15 together with the spring 23 is inserted into the channel 16, until the leading end of the spring 23 abuts against the section 21 with a simultaneous snapping of the projection 31 behind the portion 26. When this takes place the spring 23 and the wiper arm end portion connected therewith are latched and retained in the channel 16 without freedom of longitudinal displacement or, for that matter, transverse displacement.

When it is subsequently desired to release the wiper arm 15, the latter is grasped adjacent the open end 22 and at the same time the section 32 is displaced in the direction of the arrow B (FIG. 2) towards the wiper arm 15, causing the projection 31 to be disengaged whereupon the spring 23 together with the wiper arm 15 can be withdrawn from the channel 16 until the projection 28 abuts against the portions 25. This is the position illustrated in FIG. 4 in which the arm 15 can readily be disconnected from the spring 23 by disengaging it from the projections 29 and 30. It should be noted that the projections 29 and 30 need not be fully withdrawn from the channel 16, either for insertion or removal of the wiper arm end portion, because the play between the wall 19 and the arm 15 in the region of the open end 22 makes it possible to insert the wiper arm at an angle so that it can become properly lodged between the projections 29 and 30 in the manner discussed above.

The release of the arm 15 from the mounting element 14 can be further simplified if the spring 23 is so bent that, as shown in broken lines in FIG. 4, it will abut against the portions 26 in the illustrated position. When the free end of the wiper arm 15 is to be engaged with the projections 29 and 30 in such a case, the spring 23 must be moved against the arm 15 by displacing the section 32 in appropriate manner. Thereupon the arm 15 together with the spring 23 is inserted into the channel as discussed above. Subsequently, when the arm 15 is to be separated and moved to the position shown in FIG. 4, the spring will automatically move to the broken-line position and release the arm without further manipulative steps.

It will be understood that each of the elements described above, or two or more together, may also find a useful application in other types of constructions differing from the types described above.

While the invention has been illustrated and described as embodied in a windshield wiper assembly, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is set forth in the appended claims:

1. In a windshield wiper assembly, in combination, a wiper blade; a carrier for said blade; a mounting element for said carrier provided with an elongated channel having an open end; a wiper arm having an end portion adapted for releasable insertion into said channel through said open end; and an elongated latching spring comprising two sections, one of said sections being essentially flat for smooth insertion into said channel together with said end portion of said wiper arm, the other of said sections being inclined in relation to said one section and having a detent for positive engagement with at least one projection located outside said channel in the region of said open end.

2. A windshield wiper assembly as defined in claim 1, said end portion having an end face and a longitudinally spaced recess, and said mounting element having an abutment shoulder in the region of said open end; and wherein said detent portions are longitudinally spaced tongues projecting out of the general plane of said spring and respectively cooperating with said end face, recess and abutment shoulder.

3. A windshield wiper assembly as defined in claim 1, said spring further having a free end section located exteriorly of said channel and configured as a handle for releasing said one detent portion from engagement with said abutment shoulder.

4. In a windshield wiper assembly, in combination, a wiper blade; a carrier for said blade; a mounting element for said carrier provided with an elongated channel having an open end; a wiper arm having an end portion adapted for releasable insertion into said channel through said open end; and an elongated latching spring slidably accommodated in said channel and comprising at least three detent portions one of which releasably engages said mounting element in the region of said open end and the other two of which engage said end portion at longitudinally spaced locations, one of the latter being an end face and the other a recess in said end portion of said mounting element; an abutment projection adapted to cooperate with a recessed portion of said carrier and being provided on the opposite side of said end portion.

5. A windshield wiper assembly as defined in claim 4, wherein said latching spring is substantially strip-shaped and said detent portions are longitudinally spaced tongues projecting out of the general plane of said spring.

6. In a windshield wiper assembly, in combination, a wiper blade; a carrier for said blade; a mounting element for said blade provided with an elongated channel having a first and a second open end; a wiper arm having an end portion adapted for releasable insertion into said channel through said first open end; and an elongated latching spring slidably accommodated in said channel; and a wall portion provided at said second open end and bent inwardly into said channel for engaging said spring so as to prevent the same from moving out of said channel through said second open end.

7. In a windshield wiper assembly, in combination, a wiper blade; a carrier for said blade; a mounting element for said carrier provided with an elongated channel having an open end; a wiper arm having an end portion adapted for releasable insertion into said channel through said open end; and an elongated latching spring slidably accommodated in said channel and comprising at least three detent portions for securing said wiper arm to said mounting element, an inner end longitudinally spaced from said detent portions, and a detent rib intermediate said detent portions and said inner end; and at least one cooperating rib being provided on a wall bounding said channel for limiting movement of said spring outwardly through said open end.

8. A windshield wiper assembly as defined in claim 7, wherein said cooperating rib extends in direction transversely of said spring at least partially embracing the same, so as to retain said spring in slidable engagement with at least one wall bounding said channel.

9. A windshield wiper assembly as defined in claim 3, said free end section being resiliently deflectable and extending out of said open end of said channel when said spring and said end portion are received and located in operative position in said channel.

* * * * *